(12) United States Patent
Cordero et al.

(10) Patent No.: US 12,516,758 B2
(45) Date of Patent: Jan. 6, 2026

(54) QUICK CONNECT SLEEVE

(71) Applicant: The Boeing Company, Chicago, IL (US)

(72) Inventors: Edmund Cordero, Lynnwood, WA (US); Douglas Dean Maben, Snohomish, WA (US); Gary Alan Pearson, Snohomish, WA (US)

(73) Assignee: THE BOEING COMPANY, Arlington, VA (US)

( * ) Notice: Subject to any disclaimer, the term of this patent is extended or adjusted under 35 U.S.C. 154(b) by 163 days.

(21) Appl. No.: 17/992,072

(22) Filed: Nov. 22, 2022

(65) Prior Publication Data

US 2024/0167593 A1 May 23, 2024

(51) Int. Cl.
*F16L 21/00* (2006.01)

(52) U.S. Cl.
CPC .................................. *F16L 21/002* (2013.01)

(58) Field of Classification Search
CPC ..... F16L 2201/10; F16L 25/12; F16L 21/002; F16L 21/005; F16L 27/108; F16L 27/11
See application file for complete search history.

(56) References Cited

U.S. PATENT DOCUMENTS

| | | | | |
|---|---|---|---|---|
| 3,380,763 A | * | 4/1968 | Schmunk | F16L 21/022 285/369 |
| 3,430,989 A | * | 3/1969 | Wendt | F16L 21/005 277/615 |
| 3,955,834 A | * | 5/1976 | Ahlrot | F16L 21/005 285/379 |
| 5,722,702 A | * | 3/1998 | Washburn | F16L 21/002 285/369 |
| 6,145,896 A | * | 11/2000 | Vitel | F16L 21/005 285/414 |
| 2001/0026068 A1 | * | 10/2001 | Berg | F16L 27/11 285/226 |
| 2004/0226622 A1 | * | 11/2004 | Hayashi | F16L 27/11 138/121 |
| 2006/0151995 A1 | * | 7/2006 | Saarem | F16L 21/002 285/369 |

(Continued)

FOREIGN PATENT DOCUMENTS

| | | | | |
|---|---|---|---|---|
| KR | 200306038 Y1 | * | 3/2003 | ............. F16L 25/12 |
| KR | 20120066531 A | * | 6/2012 | ............. F16L 25/12 |
| NO | 136809 B | * | 8/1977 | ............. F16L 25/12 |

*Primary Examiner* — Zachary T Dragicevich
*Assistant Examiner* — Fannie Kee
(74) *Attorney, Agent, or Firm* — COATS & BENNETT, PLLC

(57) ABSTRACT

A sleeve that connects together a first duct and a second duct. The sleeve has a body with a cylindrical shape with open first and second ends. A first groove is spaced inward along the longitudinal axis from the first end and is configured to receive an end of the first duct. A first sleeve section of the body extends along the longitudinal axis between the first end and the first groove. A second groove is spaced inward along the longitudinal axis from the second end and is configured to receive an end of the second duct. A second sleeve section of the body extends along the longitudinal axis between the second end and the second groove. A central section is positioned between and spacing apart along the longitudinal axis the first groove and the second groove.

20 Claims, 6 Drawing Sheets

(56) References Cited

U.S. PATENT DOCUMENTS

| | | | |
|---|---|---|---|
| 2009/0295153 A1* | 12/2009 | Knapp | F16L 25/12 285/331 |
| 2012/0274065 A1* | 11/2012 | Knapp | F16L 25/12 285/417 |
| 2015/0260323 A1* | 9/2015 | Conrad | F16L 27/11 285/55 |

* cited by examiner

QUICK CONNECT SLEEVE

TECHNOLOGICAL FIELD

The present disclosure relates generally to the field of duct systems and, more specifically, to a sleeve that connects two ducts together.

BACKGROUND

Duct systems include ducts that are connected together to form one or more passageways for moving fluid. The duct systems can be configured to hold various types of fluid at various pressures. The duct system includes ducts that are connected together by a sleeve in an end-to-end orientation. The sleeve extends over the ends of the ducts and clamps extend around the sleeves at the overlap. The clamps are tightened to apply a compressive force to secure the sleeve to the ducts.

An issue with existing duct systems is the difficulty in effectively connecting the sleeve to the ducts. When the sleeve is not properly connected, the fluid can leak from the ducts. In more extreme instances, one or both ducts can disconnect from the sleeve resulting in a complete loss of the fluid.

One reason the sleeves fail is because there is not an adequate overlap with the ducts. The lack of overlap can cause the sleeve to slide off the duct, particularly once the fluid is introduced into the duct system and the fluid applies forces to the sleeve and ducts. The lack of overlap can also prevent the clamp from being properly mounted. The clamp may be mounted at a point where the sleeve does not overlap with the duct thus increasing the chances that the duct slides out of the sleeve.

Another issue with existing sleeves is the difficulty in being mounted on the ends of the ducts. The sizing and configuration of the sleeve may make it difficult to insert the ends of the ducts into the interior of the sleeve. As a result, the ducts may not be inserted an adequate amount into the sleeve.

SUMMARY

One aspect is directed to a sleeve to connect together a first duct and a second duct. The sleeve comprises a body with a cylindrical shape comprising a first end and an opposing second end. The body extends around an interior space and with the body comprising a longitudinal axis that extends through the interior space. A first groove is spaced inward along the longitudinal axis from the first end and is configured to receive an end of the first duct. A first sleeve section of the body extends along the longitudinal axis between the first end and the first groove. A second groove is spaced inward along the longitudinal axis from the second end and is configured to receive an end of the second duct. A second sleeve section of the body extends along the longitudinal axis between the second end and the second groove. A central section is positioned between and spacing apart along the longitudinal axis the first groove and the second groove. The first groove and the first end each comprise a larger inner diameter than the first sleeve section. The second groove and the second end each comprise a larger inner diameter than the second sleeve section.

In another aspect, the sleeve is symmetrical about a midline of the body.

In another aspect, the inner diameters of the first groove and the second groove are the same.

In another aspect, the body is constructed from a see-through material to provide for a user to visually see the first duct and the second duct within the interior space.

In another aspect, the first groove comprises a shorter length than the first sleeve section and the second groove comprises a shorter length than the second sleeve section with the lengths being measured along the longitudinal axis.

In another aspect, the first end and the second end each comprises a flared shape that extends outward at acute angles relative to the longitudinal axis.

In another aspect, tabs extend outward along the longitudinal axis from the flared first end and the flared second end with the tabs being spaced apart around a perimeter of the first end and the second end.

In another aspect, the first sleeve section comprises a smaller outer diameter than the first flared section and the first groove and the second sleeve section comprises a smaller outer diameter than the second flared section and the second groove.

In another aspect, the central section comprises bellows with concertinaed sides.

One aspect is directed to a sleeve to connect together a first duct and a second duct. The sleeve comprises a body with an elongated cylindrical shape that extends along a longitudinal axis. The body comprises: a first flared end and a second flared end; a first sleeve section that extends inward from the first flared end; a second sleeve section that extends inward from the second flared end; a first groove spaced inward along the longitudinal axis from the first sleeve section with the first groove comprising a larger inner diameter than the first sleeve section; and a second groove spaced inward along the longitudinal axis from the second sleeve section with the second groove comprising a larger inner diameter than the second sleeve section.

In another aspect, the body is constructed from a see-through material to view a position the first duct within the first groove and the second duct within the second groove.

In another aspect, a central section is positioned along the longitudinal axis between and spaces apart the first groove and the second groove with the central section comprising bellows to facilitate movement of the first end of the body relative to the second end of the body.

In another aspect, a central section is positioned between and spaces apart along the longitudinal axis the first groove and the second groove with the central section comprising an inner diameter that is smaller than the first groove and the second groove.

In another aspect, tabs are positioned on the first end and the second end with the tabs spaced apart around a perimeter of the first end and the second end and extending outward along the longitudinal axis.

In another aspect, the sleeve is symmetrical about a midline of the body.

In another aspect, the first flared end abuts with the first sleeve section and the second flared end abuts with the second sleeve section.

One aspect is directed to a method of connecting a first duct to a second duct with a sleeve. The method comprises: inserting an end of the first duct into a flared first end of the sleeve; inserting an end of the second duct into a flared second end of the sleeve; sliding the first duct axially along the sleeve and through a first sleeve section that comprises a smaller inner diameter than the flared first end; sliding the end of the first duct through the first sleeve section and aligning a radial duct bead on the first duct within a first groove of the sleeve with the first groove having a larger inner diameter than the first sleeve section; sliding the second duct axially along the sleeve and through a second sleeve section that comprises a smaller inner diameter than the flared second end; and sliding the end of the second duct through the second sleeve section and aligning a radial duct bead on the second duct within a second groove of the sleeve with the second groove having a larger inner diameter than the second sleeve section.

In another aspect, the method further comprises visually observing the first duct slide through the sleeve and the radial duct bead on the first duct moving into the first groove.

In another aspect, the method further comprises visually observing the second duct slide through the sleeve and the radial duct bead on the second duct moving into the second groove.

In another aspect, the method further comprises aligning a central section of the sleeve that is positioned between the first groove and the second groove around a gap formed between the first duct and the second duct.

The features, functions and advantages that have been discussed can be achieved independently in various aspects or may be combined in yet other aspects, further details of which can be seen with reference to the following description and the drawings.

DETAILED DESCRIPTION

Figure 1:
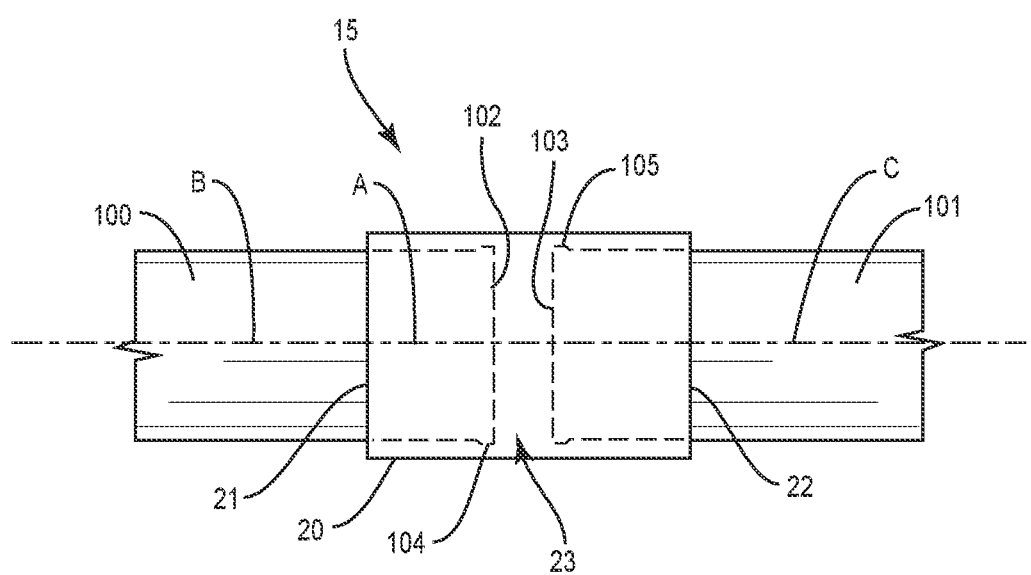
FIG. 1 is a side schematic diagram of a sleeve connecting together a first duct and a second duct.

The present application is directed to a sleeve 15 that connects together a first duct 100 and a second duct 101. The sleeve 15 connects the first and second ducts 100, 101 together and prevents the fluid from leaking from the interior. FIG. 1 schematically illustrates a sleeve 15 connected to a first duct 100 and a second duct 101. The sleeve 15 includes an elongated body that has a longitudinal axis A. The sleeve 15 includes a hollow interior space 23 with a first end 21 open to receive the first duct 100 and a second end 22 open to receive the second duct 101. The sleeve 15 has a length measured along the longitudinal axis A to overlap with the first and second ducts 100, 101 and span any gap between the ducts.

In one example, the ducts 100, 101 include duct beads 104, 105 that extend radially outward from the outer sides. In one example, the duct beads 104, 105 are positioned at the first end 102 and the second end 103 of the respective ducts 100, 101. In other examples, the duct beads 104, 105 are spaced inward from the ends 102, 103. The duct beads 104, 105 can includes beads, bends, or other structures formed by the duct itself and/or connected to the ducts 100, 101. In one specific example, the duct beads 104, 105 are beads formed into the duct and which extend around the perimeter of the ducts 100, 101. The sleeve 15 is configured to accommodate the duct beads 104, 105 both during insertion into the ducts 100, 101, movement along the lengths of the ducts 100, 101, and positioned within the ducts 100, 101 when fully inserted.

The sleeve 15 positions the ducts 100, 101 in an end-to-end orientation. The distance between the ducts 100, 101 can vary. In one example as illustrated in FIG. 1, the sleeve 15 aligns the longitudinal axis B of the first duct 100 to be co-axial with the longitudinal axis C of the second duct 101. In another example, the first and second ducts 100, 101 are aligned in an offset angular orientation (i.e., longitudinal axes B and C are not co-axial). In one example, the sleeve 15 spaces apart the first and second ducts 100, 101 to form a gap between the first and second ends 21, 22.

Figure 2:
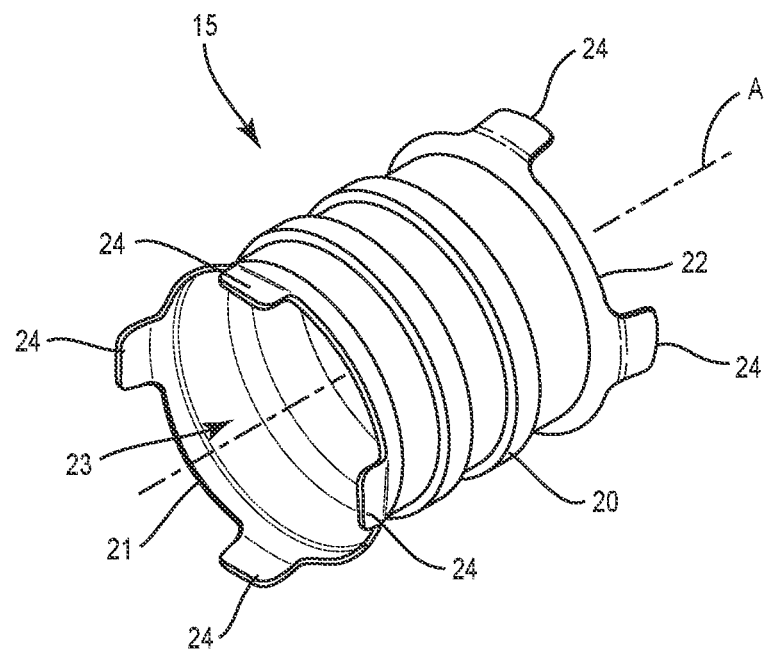
FIG. 2 is an isometric view of a sleeve.
Figure 3:
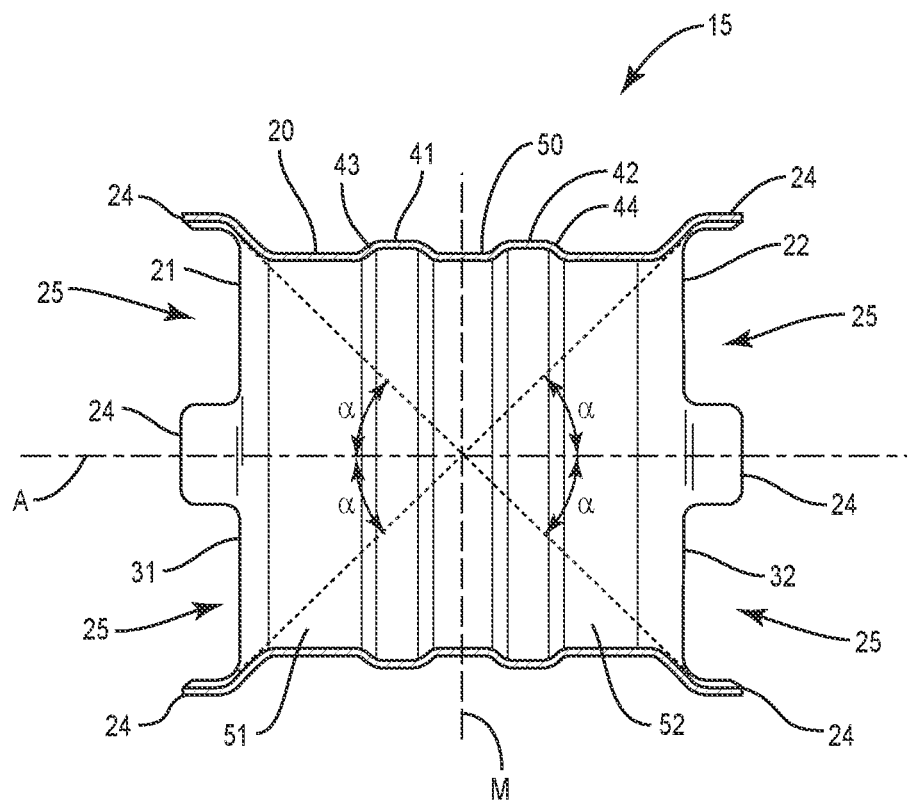
FIG. 3 is a side view of the sleeve of FIG. 2.

FIGS. 2 and 3 illustrate a sleeve 15 that includes an elongated body 20. The sleeve 15 has a cylindrical shape with an open interior space 23. Each of the first end 21 and the second end 22 are open to receive the respective ducts 100, 101. A first sleeve section 51 is positioned inward from the first end 21. A second sleeve section 52 is positioned inward from the second end 22. The first and second sleeve sections 51 have a first inner diameter D1. In one example, the first inner diameter D1 is slightly larger than the outer diameter of the first and second ducts 100, 101. This relative sizing provides for a tight fit between the sleeve 15 and the first and second ducts 100, 101. In another example, the first inner diameter D1 is smaller than the outer diameter of the first and second ducts 100, 101. The sleeve 15 is constructed from a material that expands during insertion of the first and second ducts 100, 101. In another example, the first inner diameter D1 is considerably larger than the outer diameter of the ducts 100, 101.

In one example, the ends of the first and second ends 21, 22 are the same inner diameter. This provides for connecting ducts 100, 101 that have the same size. In another example, the first and second ends 21, 22 have different inner diameters. The different sizes provide for transitioning between two ducts 100, 101 that have different outer diameters.

The first and second sleeve sections 51, 52 each have a length measured along the longitudinal axis A. The lengths of the sleeve sections 51,52 can be the same or different. The inner diameters D1 of the first and second sleeve sections 51,52 can be constant along the lengths or can vary. In one example, the first sleeve section 51 and the second sleeve section 52 have the same inner diameter D1. In another example, the sleeve sections 51, 52 have different inner diameters D1.

Figure 4A:
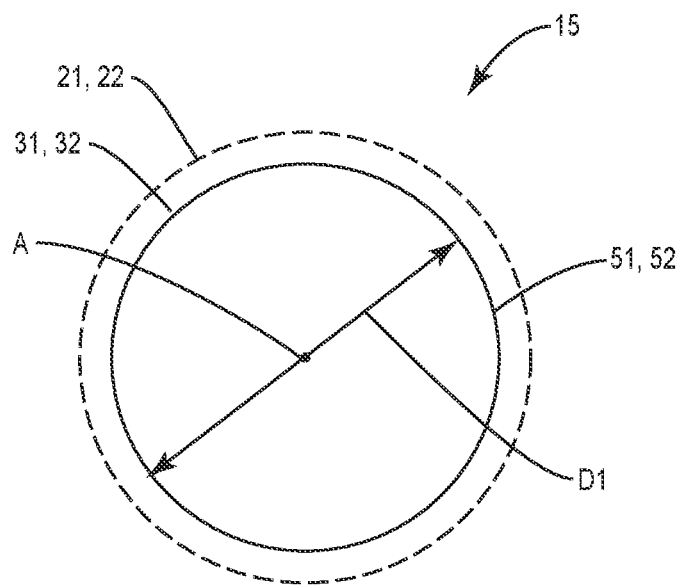
FIG. 4A is a schematic diagram illustrating relative sizes of one example of an inner diameter of first and second sleeve sections and first and second flared sections.

The sleeve 15 includes a first flared section 31 at the first end 21 and a second flared section 32 at the second end 22. The flared sections 31, 32 extend outward along the longitudinal axis A away from the respective first and second sleeve sections 51, 52. The flared sections 31, 32 act as a funnel to direct the ends of the ducts 100, 101 and facilitate insertion of the first and second ducts 100, 101 into the sleeve 15. As illustrated in FIGS. 3 and 4A, the flared sections 31, 32 include an inner end with an inner diameter that is same as the inner diameter of the respective sleeve sections 51, 52. The size of the flared sections 31, 32 increases outward to an exposed end. The flared sections 31, 32 are aligned at an acute angle α relative to the longitudinal axis A as illustrated in FIG. 3. The inner diameter of the flared sections 31, 32 increases longitudinally outward away from the midline M. In one example, the inner diameter consistently increases along the length. In another example, the inner diameter includes one or more flat sections along the length with a constant diameter. In one example as illustrated in FIG. 3, the flared section 31 has the same shape and size as the flared section 32. In another example, the flared section 31 includes a different shape and/or size.

Tabs 24 are spaced apart by gaps 25 around the perimeter of the flared sections 31, 32. The tabs 24 have a length to extend along the longitudinal axis A. The tabs 24 form grips for a user to grasp when connecting the sleeve 15 to one or both of the ducts 100, 101. The tabs 24 are positioned radially outward beyond the sleeve sections 51, 52. This positioning places the tabs 24 away from the ducts 100, 101 when inserted in the sleeve 15 thus providing for gripping by the user. In one example as illustrated in FIG. 3, the tabs 24 are aligned substantially parallel with the longitudinal axis A. In another example, the tabs 24 are flared outward.

Figure 4B:
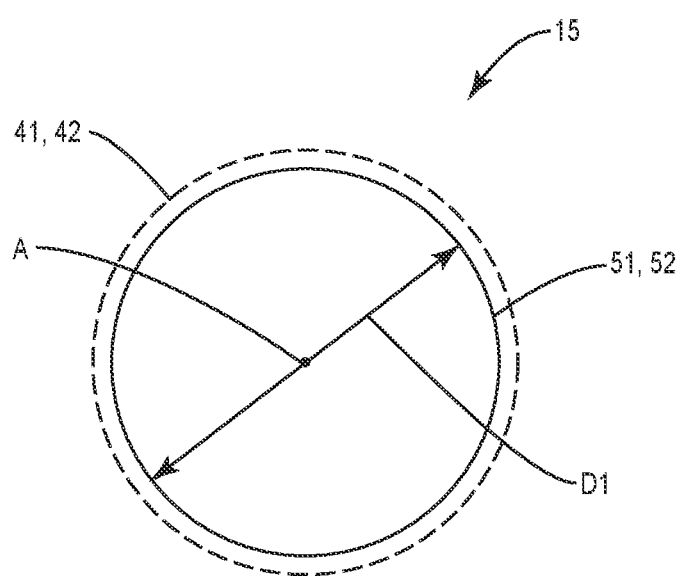
FIG. 4B is a schematic diagram illustrating relative sizes of one example of first and second sleeve sections and first and second grooves.

First and second grooves 41, 42 are positioned along the length inward from the respective first and second sleeve sections 51, 52. As illustrated in FIG. 4B, the grooves 41, 42 have a larger inner diameter than the respective first and second sleeve sections 51, 52. The grooves 41, 42 are configured to accommodate the duct beads 104, 105 that extend radially outward from the ducts 100, 101.

As illustrated in FIG. 3, the grooves 41, 42 include ramps 43, 44 positioned at the respective sleeve sections 51, 52. The ramps 43, 44 form a transition between the different sections that have different diameters. The ramps 43, 44 have an inner diameter that gradually increases towards the midline M of the sleeve 15. The ramps 43, 44 provide for the duct beads 104, 105 on the first and second ducts 100, 101 to slide into the grooves 41, 42 during insertion. The ramps 43, 44 further prevent/reduce detachment of the ducts 100, 101 as the duct beads contact against the surfaces which prevents sliding movement of the ducts 100, 101 out of the sleeve 15.

Figure 5A:
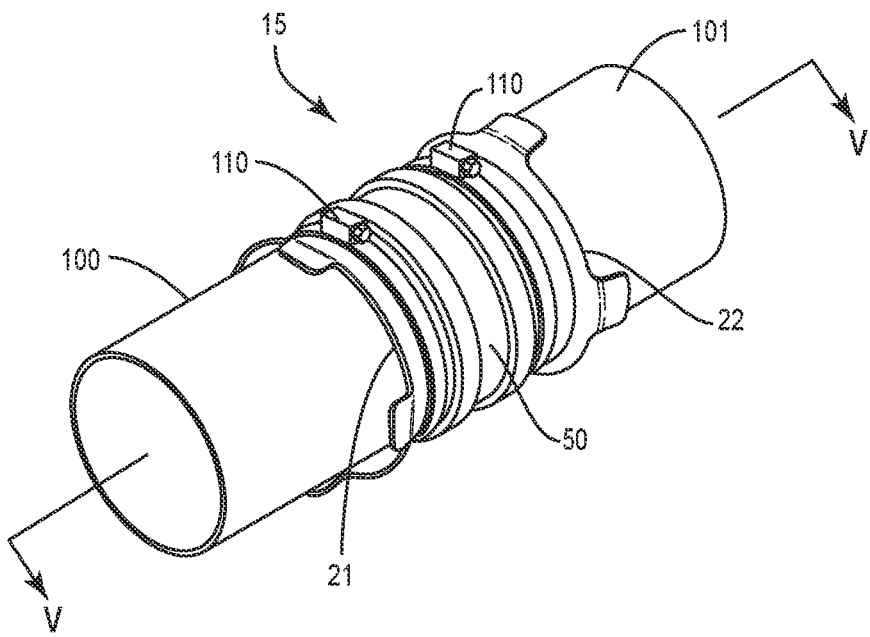
FIG. 5A is an isometric view of a sleeve connecting together a first duct and a second duct.
Figure 5B:
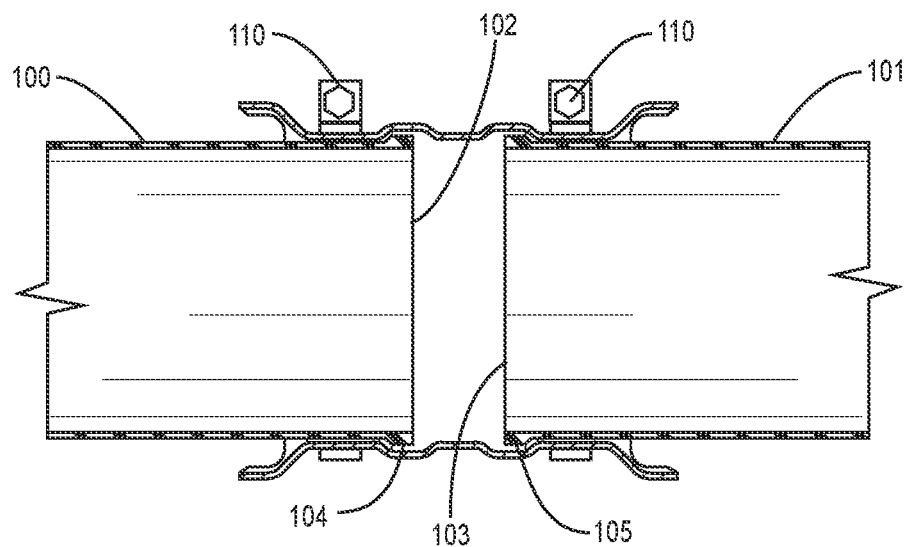
FIG. 5B is a sectional view of the sleeve and ducts of FIG. 5A cut along line V-V.

The sleeve 15 further includes a central section 50 that extends between the first and second grooves 41, 42. The central section 50 is positioned to span the intersection between the ends 102, 103 of the two ducts 100, 101. In one example as illustrated in FIGS. 5A and 5B, the central section 50 is a thin, flat section with an inner diameter that is substantially the same as the inner diameter D1 of the first and second sleeve sections 51, 52.

Figure 6:
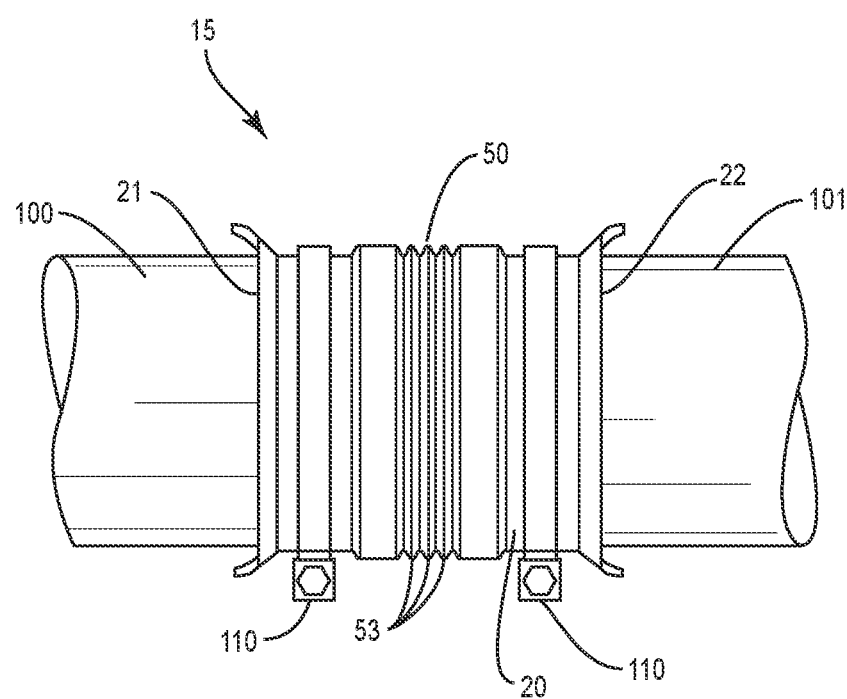
FIG. 6 is a side view of a sleeve connecting together a first duct and a second duct.

In one example, the central section 50 includes bellows 53 as illustrated in FIG. 6 [6A]. The bellows 53 include concertinaed sides that allow for expansion and contraction. The bellows 53 provide for adjusting the positions of the two ends 21, 22 relative to each other in the event the ducts 101, 101 are not coaxially aligned. Once connected, the bellows 53 provide for relative movement between the ducts 100, 101. The length and sizing of the bellows 53 can vary.

The different sections of the sleeve 15 can have different shapes and sizes. In one example as illustrated in FIG. 3, the sleeve 15 has a straight shape and is symmetrical about the midline M. In other examples, the sleeve 15 is asymmetrical about the midline M.

The inner diameter D1 of the sleeve sections 51, 52 are smaller than both of the bordering flared sections 31, 32 and grooves 41, 42. In one example, the grooves 41, 42 and the outer ends of the flared sections 31, 32 include the same diameters. In another example, the outer ends of the flared sections 31, 32 include larger diameters to facilitate the alignment and insertion of the ducts 100, 101 into the interior space 23 of the sleeve 15.

The sleeve sections 51, 52 also include a smaller outer diameter than the bordering flared sections 31, 32 and grooves 41, 42. This smaller diameter maintains a clamp/strap 110 positioned along the sleeve sections 51, 52. As illustrated in FIGS. 5A, 5B, and 6, the clamps 110 have an annular shape and extend around the sleeve sections 51, 52 of the sleeve 15. The smaller outer diameter maintains the clamps 110 along the sleeve sections 51, 52 as the larger bordering flared sections 31, 32 and grooves 41, 42 limit the amount of movement of the clamps 110 along the sleeve 15 along the longitudinal axis A. The clamps 110 are configured to apply a compressive force to maintain the sleeve 15 attached to the ducts 100, 101.

The different sections of the sleeve 15 can include different lengths measured along the longitudinal axis A. In one example, the sleeve sections 51, 52 include larger lengths than both of the flared sections 31, 32 and the grooves 41,42. In one example, the grooves 41, 42 include larger lengths than the flared sections 31, 32. FIG. 3 includes an example with the sleeve sections 51, 52 including a larger length than the grooves 41, 42, and the grooves 41,42 having a larger length than the flared sections 31,32. FIG. 3 also includes the sleeve sections 51,52 having a larger length than the central section 50.

The sleeve 15 can be constructed from a variety of different materials. Examples include but are not limited to fluorinated ethylene propylene (FEP), polytetrafluoroethylene (PTFE), plasticized vinyl, and perfluoroalkoxy (PFA). In one specific example, the sleeve 15 is molded from plasticized vinyl.

In one example, the sleeve 15 is opaque. In another example, the sleeve 15 is constructed from a material that is see-through to allow for the user to visually see the ducts 100, 101 within the interior space 23. The see-through material of the sleeve 15 can be translucent such that some light travels through the sleeve or transparent in which almost all light passes directly through the sleeve 15. The visual identification provides for the user to visually observe the relative positions of the sleeve 15 and first and second ducts 100, 101. The see-through nature of the sleeve 15 facilitates the user in seating the duct beads 104, 105 on the ducts 100, 101 with the respective grooves 41, 42.

The process of connecting the sleeve 15 to the first duct 100 includes aligning the end 102 of the first duct 100 with the flared section 31. The first duct 100 is moved relative to the sleeve 15 with the flared section 31 acting as a funnel to align the first duct 100 with the sleeve 15. The first end 21 moves along the longitudinal axis A through the flared section 31 and into the first sleeve section 51. The first duct 100 continues to move along the sleeve 15 with the first end 21 moving through the first sleeve section 51 and into the flared section 31. The first duct 100 is moved until the duct beads 104 on the first duct 100 is positioned within the groove 41. In one example, the ramp 43 provides a tactile feel and/or audible sound indicating that the duct beads 104 has moved against the ramp 43. When the sleeve 15 is see-through, the user can visually observe the position of the first end 21 relative to the sleeve 15. The see-through design provides for the user to visually observe the position of the duct bead 104 and determine when it is seated in the groove 41.

Once the sleeve 15 is positioned on the first duct 100, the clamp/strap 110 is tightened to secure the connection. The clamp/strap 110 is positioned along the first sleeve section 51. With the first end 21 of the duct 100 aligned along the first groove 41, the clamp/strap 110 is positioned where there is overlap between the sleeve 15 and duct 100 to ensure a good connection. In one example, the clamp/strap 110 is loosely positioned along the first sleeve section 51 prior to insertion of the first duct 100. In another example, the clamp/strap 110 is positioned on the sleeve 15 after the first duct 100 has been inserted.

The second duct 101 is inserted in a similar manner. The first end 103 is aligned with the sleeve 15 and inserted through the second flared section 32 into the second end 22 of the sleeve 15. The second duct 101 is moved relative to the sleeve 15 with the end 103 of the duct 101 moving along the second sleeve section 52 and then into the second groove 42. Once positioned, the clamp/strap 110 positioned on the second sleeve section 52 is tightened to secure the sleeve 15 to the second duct 101.

The sleeve 15 can be connected to the ducts 100, 101 in various orders. One of the ducts 100, 101 can be connected initially followed by the other duct 100, 101. In another example, the ducts 100, 101 are simultaneously inserted into the sleeve 15.

The tabs 24 provide for the user to grasp the sleeve 15 and apply a force to slide the sleeve 15 onto the ducts 100, 101. The tabs 24 are positioned along a perimeter of the sleeves 15 such that they are spaced radially outward away from the ducts 100, 101 to be grasped by the user. The sleeve 15 is configured to by axially moved relative to the ducts 100, 101 without rotation.

Figure 7:
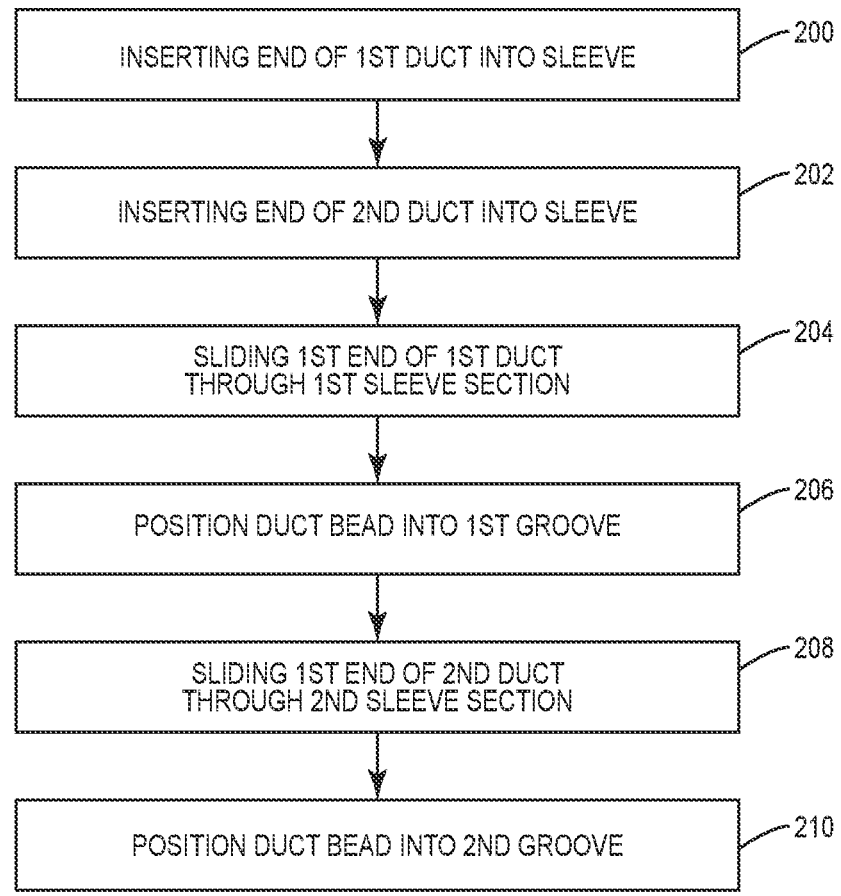
FIG. 7 is a flowchart diagram of a method of connecting a first duct to a second duct with a sleeve.

FIG. 7 illustrates a method of connecting a first duct 100 to a second duct 101 with a sleeve 15. The method includes inserting an end 102 of the first duct 100 into a flared first end 21 of the sleeve 15 (block 200). The flared first end 21 has a larger inner diameter than the outer diameter of the first duct 100 to allow for the insertion. An end of a second duct 101 is inserted into a flared second end 22 of the sleeve 15 (block 202). The flared second end 22 has a larger inner diameter than the outer diameter of the second duct 100. The first duct 100 is slid axially along the sleeve 15 and through a first sleeve section 51 (block 204). The first sleeve section 51 has a smaller inner diameter than the flared first end 21. The end of the first duct 100 is slid through the first sleeve section 51 and a duct bead 104 on the first duct 100 is aligned within a first groove 41 of the sleeve 15 (block 206). The first groove 41 has a larger inner diameter than the first sleeve section 51. The second duct 101 is slid axially along the sleeve 15 and through a second sleeve section 52 (block 208) that has a smaller inner diameter than the flared second end 22. The second duct 101 is slid through the second sleeve section 52 and a duct bead 105 on the second duct 101 is aligned within a second groove 42 of the sleeve 15 (block 210). The second groove 42 has a larger inner diameter than the second sleeve section 52.

In one example, the ramps 43, 44 of the first and second grooves 41, 42 are aligned at an acute angle relative to the longitudinal axis A as illustrated in FIG. 3. In another example, the grooves 41, 42 instead include an outer edge that is aligned substantially perpendicular to the longitudinal axis A. This perpendicular edge provides for tactile and/or audio feedback when the duct bead passes into the groove 41, 42 during insertion of the duct 100, 101.

By the term "substantially" with reference to amounts or measurement values, it is meant that the recited characteristic, parameter, or value need not be achieved exactly. Rather, deviations or variations, including, for example, tolerances, measurement error, measurement accuracy limitations, and other factors known to those skilled in the art, may occur in amounts that do not preclude the effect that the characteristic was intended to provide.

The sleeve 15 can be used to connect together ducts in a variety of different applications. One specific example includes connecting together ducts on aircraft such as but not limited to commercial aircraft.

The present invention may be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A sleeve to connect together a first duct and a second duct, the sleeve comprising:
   a body with a cylindrical shape comprising a first end and an opposing second end, the body extending around an interior space, the body comprising a longitudinal axis that extends through the interior space;
   a first groove spaced inward along the longitudinal axis from the first end and configured to receive an end of the first duct, the first groove comprising a leading ramp with an inner diameter that gradually increases away from the first end and a trailing ramp with an inner diameter that gradually decreases away from the second end;
   a first sleeve section of the body that extends along the longitudinal axis between the first end and the first groove, the first sleeve section comprising a constant inner diameter;
   a second groove spaced inward along the longitudinal axis from the second end and configured to receive an end of the second duct, the second groove comprising a leading ramp with an inner diameter that gradually increases away from the second end and a trailing ramp with the inner diameter that gradually decreases away from the second end;
   a second sleeve section of the body that extends along the longitudinal axis between the second end and the second groove, the second sleeve section comprising a constant inner diameter;
   a central section positioned between and spacing apart along the longitudinal axis the first groove and the second groove, the central section comprising an inner diameter that is constant between the first groove and the second groove;
   wherein the first groove and the first end each comprising a larger inner diameter than the first sleeve section;
   wherein the second groove and the second end each comprising a larger inner diameter than the second sleeve section;
   wherein the first groove comprises a shorter length than the first sleeve section and the second groove comprises a shorter length than the second sleeve section with the lengths being measured along the longitudinal axis; and
   wherein the inner diameter of central section is smaller than the inner diameters of the first groove and the second groove and the inner diameter of the central section is the same as the inner diameter of the first sleeve section and the second sleeve section.

2. The sleeve of claim 1, wherein the sleeve is symmetrical about a midline of the body.

3. The sleeve of claim 2, wherein the midline extends through the central section.

4. The sleeve of claim 1, wherein inner diameters of the first groove and the second groove are the same.

5. The sleeve of claim 1, wherein the body is constructed from a see-through material to provide for a user to visually see the first duct and the second duct within the interior space and a position of duct beads within the first groove and the second groove.

6. The sleeve of claim 1, wherein the first end and the second end each comprises a flared shape that extends outward at acute angles relative to the longitudinal axis.

7. The sleeve of claim 6, further comprising tabs that extend outward along the longitudinal axis from the flared first end and the flared second end, wherein the tabs are spaced apart around a perimeter of the first end and the second end.

8. The sleeve of claim 1, wherein the body is constructed from plasticized vinyl.

9. The sleeve of claim 1, wherein the longitudinal axis is straight and the sleeve is symmetrical about a midline of the body.

10. A sleeve to connect together a first duct and a second duct, the sleeve comprising:
   a body with an elongated cylindrical shape that extends along a longitudinal axis, the body comprising:
      a first flared end and a second flared end;
      a first sleeve section that extends inward from the first flared end;
      a second sleeve section that extends inward from the second flared end;
      a first groove spaced inward along the longitudinal axis from the first sleeve section, the first groove comprising a larger inner diameter than the first sleeve section;
      a second groove spaced inward along the longitudinal axis from the second sleeve section, the second groove comprising a larger inner diameter than the second sleeve section;
      a central section that extends between the first groove and the second groove, the central section comprising an inner diameter that is constant between the first groove and the second groove;
   wherein the first sleeve section and the second sleeve section are flat;
   wherein the first groove has a shorter length than the first sleeve section, and the second groove has a shorter length than the second sleeve section; and
   wherein the inner diameter of the central section is smaller than inner diameters of the first groove and the second groove, and wherein the inner diameter of the central section is the same as the inner diameters of the first sleeve section and the second sleeve section.

11. The sleeve of claim 10, wherein the body is constructed from a see-through material to view a position of the first duct within the first groove and the second duct within the second groove.

12. The sleeve of claim 11, wherein each of the first flared end and the second flared end extend outward at acute angles relative to the longitudinal axis.

13. The sleeve of claim 10, further comprising tabs positioned on the first flared end and the second flared end, the tabs spaced apart around a perimeter of the first flared end and the second flared end and extending outward along the longitudinal axis.

14. The sleeve of claim 10, wherein the longitudinal axis is straight and the sleeve is symmetrical about a midline of the body.

15. The sleeve of claim 14, wherein the midline extends through the central section.

16. The sleeve of claim 10, wherein the first flared end abuts with the first sleeve section and the second flared end abuts with the second sleeve section.

17. A method of connecting a first duct to a second duct with a sleeve, the method comprising:
   inserting an end of the first duct into a flared first end of the sleeve;
   inserting an end of the second duct into a flared second end of the sleeve;
   sliding the first duct axially along the sleeve and through a first sleeve section that comprises a smaller inner diameter than the flared first end and with the inner diameter of the first sleeve section being flat;
   sliding the end of the first duct through the first sleeve section and sliding a radial duct bead on the first duct along a ramp of a first groove that gradually increases towards a midline of the sleeve and aligning the radial duct bead within the first groove of the sleeve with the first groove having a larger inner diameter than the first sleeve section and sliding the end of the first duct a shorter distance along the first groove than along the first sleeve section;
   sliding the second duct axially along the sleeve and through a second sleeve section that comprises a smaller inner diameter than the flared second end and with the inner diameter of the second sleeve section being flat; and
   sliding the end of the second duct through the second sleeve section and sliding a radial duct bead on the second duct along a ramp of a second groove that gradually increases towards the midline of the sleeve and aligning the radial duct bead within the second groove of the sleeve with the second groove having a larger inner diameter than the second sleeve section and sliding the end of the second duct a shorter distance along the second groove than along the second sleeve section.

18. The method of claim 17, further comprising visually observing the first duct slide through the sleeve and the radial duct bead on the first duct moving into the first groove.

19. The method of claim 18, further comprising visually observing the second duct slide through the sleeve and the radial duct bead on the second duct moving into the second groove.

20. The method of claim 17, further comprising aligning a central section of the sleeve that is positioned between the first groove and the second groove around a gap formed between the first duct and the second duct.

* * * * *